(No Model.)

R. J. LOUGHERY.
ADDRESS TAG.

No. 416,472. Patented Dec. 3, 1889.

Witnesses,
Geo. H. Strong
J. H. Rouse

Inventor,
Robert J. Loughery,
By Dewey & Co
Attys

N. PETERS, Photo-Lithographer, Washington, D. C.

UNITED STATES PATENT OFFICE.

ROBERT J. LOUGHERY, OF SAN FRANCISCO, CALIFORNIA.

ADDRESS-TAG.

SPECIFICATION forming part of Letters Patent No. 416,472, dated December 3, 1889.

Application filed June 19, 1889. Serial No. 314,882. (No model.)

*To all whom it may concern:*

Be it known that I, ROBERT J. LOUGHERY, of the city and county of San Francisco, State of California, have invented an Improvement in Address-Tags; and I hereby declare the following to be a full, clear, and exact description of the same.

The object of my invention is to provide a convenient and effective device for use in putting up and shipping bundles of merchandise with a permanent tag on which to mark the address of the goods for shipment or other purposes.

It consists of a combination binding-board and tag having ropes permanently attached thereto, said ropes being passed around the bale or bundle, so as to inclose the whole and the board with them.

Figure 1:
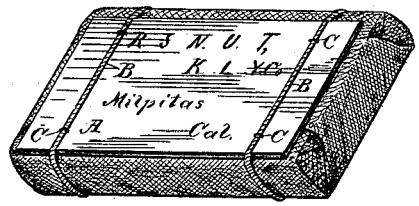
Figure 2:
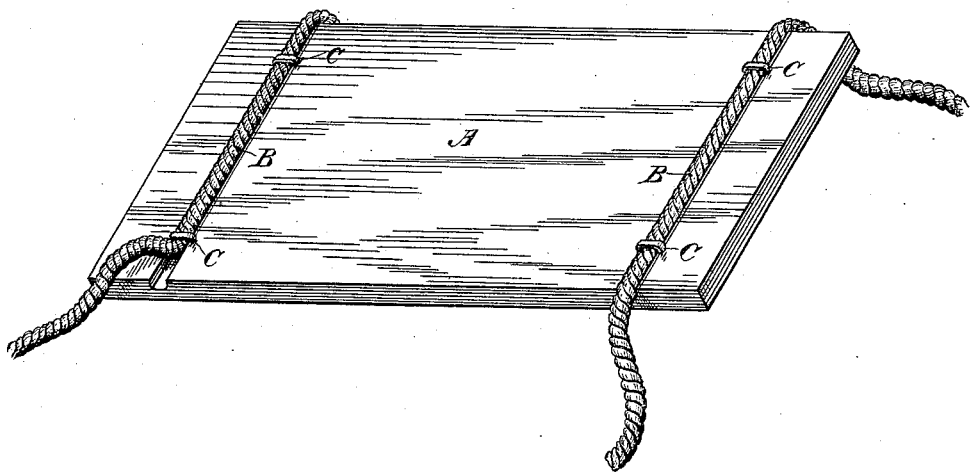

Referring to the accompanying drawings for a more complete explanation of my invention, Figure 1 is a view showing the bundle or bale made up with my binding-board and tag attached. Fig. 2 is a view showing the binding-board and tag with its ropes separate and ready for use.

In making up bales or bundles of various kinds of goods—such as clothing or other materials—it is customary to wrap them in burlaps and tie them up under pressure, the address being marked by a marking-brush upon the outside of the burlaps. This method is open to objection, because the burlaps are apt to become torn and the address become obliterated in one way or another.

In my present invention I employ a flat smooth board A, which in the present case I have shown with transverse channels across one side near the ends, these channels being of sufficient depth and diameter to allow the rope B, which is used in securing the bundle or bale together, to lie in the channels, where it may be secured by means of staples or other fastenings C. The rope being thus secured to the board, the ends are passed around the bale, after the latter has been completed and properly compressed, and, the ropes being fastened, the binding-board and tag will remain permanently attached, and it will be impossible to remove it until the ropes are taken off. Upon this board, as a tag, the name, address, or other matter which it may be desired to attach to the bale or bundle, is marked in any suitable or desirable manner, and will there remain as permanent as the board itself.

It will be manifest that the ropes might be attached in various ways, as by channeling the ends of the board to a sufficient depth to allow the rope to be pressed in to some distance, or by attaching the rope to the board without any channels whatever; but I find that the channels made in the way here shown are simple and convenient, as they insure the rope being attached to the board at the proper points and in a straight line across the board. The device is expeditious and convenient. It saves time and labor in making up the bundles. The marks cannot be obliterated without entirely destroying the board, and the board is a protection to the bundle after it is made up in handling and storing and transporting.

Having thus described my invention, what I claim as new, and desire to secure by Letters Patent, is—

An address-tag for bales and bundles, consisting of a board or plate having independent grooves or channels made substantially parallel and transversely across one of its surfaces, and ropes permanently secured in said grooves or channels, whereby parallelism of said ropes is maintained, substantially as herein described.

It witness whereof I have hereunto set my hand.

ROBERT J. LOUGHERY.

Witnesses:
PHILIP I. FISHER,
JACOB STERN.